US012404051B2

(12) United States Patent
Gautier (10) Patent No.: US 12,404,051 B2
(45) Date of Patent: Sep. 2, 2025

(54) DEVICE FOR PNEUMATIC LAUNCHING OF A DRONE

(71) Applicant: KNDS FRANCE, Versailles (FR)

(72) Inventor: Pierre Gautier, Bourges (FR)

(73) Assignee: KNDS France, Versailles (FR)

( * ) Notice: Subject to any disclaimer, the term of this patent is extended or adjusted under 35 U.S.C. 154(b) by 0 days.

(21) Appl. No.: 18/843,578

(22) PCT Filed: Feb. 24, 2023

(86) PCT No.: PCT/IB2023/051711
§ 371 (c)(1),
(2) Date: Sep. 3, 2024

(87) PCT Pub. No.: WO2023/166389
PCT Pub. Date: Sep. 7, 2023

(65) Prior Publication Data
US 2025/0197039 A1    Jun. 19, 2025

(30) Foreign Application Priority Data
Mar. 1, 2022    (FR) ...................................... 2201677

(51) Int. Cl.
*B64U 70/50*    (2023.01)
*B64U 70/70*    (2023.01)

(52) U.S. Cl.
CPC ............ *B64U 70/70* (2023.01); *B64U 70/50* (2023.01)

(58) Field of Classification Search
CPC ........ F41F 1/06; F41F 3/00; F41F 3/04; F41F 3/045; F41F 3/0455; B64F 1/04;
(Continued)

(56) References Cited

U.S. PATENT DOCUMENTS 3,040,628 A    6/1962 Sieve et al.
3,968,947 A    7/1976 Schlegel et al.
(Continued)

FOREIGN PATENT DOCUMENTS

CN    116176898 A    *    5/2023    ................ B64F 1/06
CN    118145048 A    *    6/2024    ............. B64U 70/50
(Continued)

OTHER PUBLICATIONS

Sep. 20, 2022 Search Report and Written Opinion issued in French Patent Application No. 2201677.
(Continued)

*Primary Examiner* — Joshua E Rodden
(74) *Attorney, Agent, or Firm* — Oliff PLC (57) ABSTRACT

A device for pneumatic launching of a drone includes a launch tube, a pressurization chamber situated at the rear of the tube and provided with a passage opening leading into the tube, and a device for temporarily closing the passage opening. The temporary closing device is arranged to change from a closed configuration to an open configuration instantaneously under the action of the gas pressure inside said chamber, after the latter has reached a trigger pressure, and the cross section of the passage opening is sufficiently large that, instantaneously with the change to the open configuration, the gas pressure prevailing in the chamber and the space located behind the drone, then in communication with each other, is the desired launching pressure for the drone.

10 Claims, 6 Drawing Sheets

(58) Field of Classification Search
CPC ... B64F 1/06; B64F 1/10; B64U 70/50; B64U 70/70; B64U 80/70; B64U 80/80; B64U 80/82; B64U 80/84; B64U 80/86
USPC .......................................................... 244/63
See application file for complete search history.

(56) References Cited

U.S. PATENT DOCUMENTS

| | | | |
|---|---|---|---|
| 7,584,925 B2 | 9/2009 | Miller et al. | |
| 7,739,938 B2* | 6/2010 | Nair | F41B 11/62 89/7 |
| 8,505,430 B2* | 8/2013 | Miralles | F41F 3/042 89/1.816 |
| 9,453,705 B2* | 9/2016 | Sylvia | F42B 15/105 |
| 9,470,477 B2* | 10/2016 | Su | B64F 1/04 |
| 9,612,085 B2* | 4/2017 | Powell | F41F 3/07 |
| 10,464,693 B2* | 11/2019 | Sylvia | B63G 8/28 |
| 11,591,050 B2* | 2/2023 | Graham | B64U 80/70 |
| 11,959,725 B2* | 4/2024 | Faizan | F41F 3/07 |
| 12,030,666 B2* | 7/2024 | Kuperman | B64F 1/04 |
| 12,111,137 B2* | 10/2024 | Theiss | B64U 70/30 |
| 2012/0205488 A1* | 8/2012 | Powell | B63G 8/30 244/63 |
| 2014/0150683 A1* | 6/2014 | Dunaway | F41F 3/04 102/530 |
| 2018/0244402 A1* | 8/2018 | Kahlon | B64F 1/04 |
| 2023/0049500 A1* | 2/2023 | Murphy | B64U 70/50 |

FOREIGN PATENT DOCUMENTS

| | | | |
|---|---|---|---|
| FR | 2 297 770 A1 | 8/1976 | |
| FR | 3133051 A1 * | 9/2023 | ................ B64F 1/06 |
| KR | 2023161099 A * | 11/2023 | ........... B64C 39/024 |
| WO | 2013/011412 A1 | 1/2013 | |
| WO | 2014/035518 A2 | 3/2014 | |
| WO | 2015/127178 A1 | 8/2015 | |

OTHER PUBLICATIONS

May 24, 2023 International Search Report issued in International Patent Application No. PCT/IB2023/051711.

May 24, 2023 Written Opinion issued in International Patent Application No. PCT/IB2023/051711.

\* cited by examiner

DEVICE FOR PNEUMATIC LAUNCHING OF A DRONE

BACKGROUND OF THE INVENTION

Field of the Invention

The technical field of the invention is that of pneumatic launch devices, and more specifically, devices for pneumatic launching of drones.

Drones can carry payloads for civil or military surveillance, intelligence, combat or transport missions. As small flying machines that are cheaper and simpler to operate than aircraft with pilots, drones are enjoying a boom.

Description of Related Art including information disclosed under 37 CFR 1.97 and 1.98.

Several means for launching drones are known, including pneumatic launch devices.

A pneumatic launch device is one that uses compressed air, or any other type of pressurized gas, to cause the drone to be launched.

Typically, a pneumatic launch device comprises a pressurization chamber which is pressurized by a compressed gas. Releasing the pressure in the chamber generates energy, which is used to propel the drone.

There are many types of pneumatic launch devices. In particular, pressure can be released by a variety of means.

A known type of pneumatic launch device is a drone launcher with a pneumatic catapult, such as that disclosed, for example, in French patent application FR2297770 A1. The operating principle of this pneumatic catapult is the expansion of a pressurized gas in a telescopic assembly of two concentric cylindrical tubes so as to cause one to move rectilinearly relative to the other.

Another known type of pneumatic launch device is a device with a launch tube, such as those disclosed in US patent U.S. Pat. No. 7,584,925 B2 and in international patent applications WO2015/127178, WO2013/011412 and WO2014/035518.

The aim of these devices with launch tube is to propel the drone a few metres above the vehicle carrying the launch tube, for deployment of the drone, in order to avoid any contact between the drone and the antennae mounted on the vehicle and to deploy the drone quickly.

In the launch device according to U.S. Pat. No. 7,584,925 B2, during launch, a launch gas contained in a launch gas reservoir is released into a launch tube after opening a valve system, a first part of this launch gas forces a free sliding piston mounted inside the launch tube to move towards the open front end of the launch tube, and a second part of the launch gas leaves the launch tube through its open front end.

In the launch device according to patent application WO2015/127178, during launch, a compressed gas contained in a chamber is released into a launch tube containing the drone after opening a bleed valve.

In the launch device according to patent application WO2014/035518, during launch, a gas generated by a gas generator arranged inside a launch tube is introduced into a high-pressure volume defined between a skirt of a sabot and a casing containing the gas generator, the skirt being releasably coupled to the casing via an adhesive coupling. The resulting gas pressure presses against the skirt until the adhesive coupling breaks, once a certain rupture pressure has been reached in the high-pressure volume. The gas that continues to be generated then pushes the released skirt against the wall of the launch tube to drive the sabot along the launch tube until the drone is ejected from the launch tube. The disadvantage of the devices with launch tube described above is that they do not allow sufficient control of the value of the gas pressure by which the drone is ejected, and therefore do not allow control of the speed and height of the drone ejection, so that it is necessary to provide a safety margin before the drone is deployed in order to prevent it from coming into contact with, for example, the vehicle antennae.

BRIEF SUMMARY OF THE INVENTION

The aim of the present invention is therefore to provide a pneumatic launch device that enables the launching pressure by which the drone is ejected to be controlled, thus enabling a drone to be ejected reliably and reproducibly, and by means of which an effectively quick deployment of the drone can be implemented.

The solution according to the present invention is based on the use of means enabling the pressure by which the drone is to be ejected to be applied instantaneously to the drone, and not a gradual, or even partial, release of gas pressure behind the drone as in devices in the prior art.

Patent application WO2013/011412 describes a device according to the preamble of claim 1.

The present invention thus relates to a device for pneumatic launching of a drone, the device comprising:
- a longitudinal launch tube having a first, rear end, which is closed and a second, front end, which is open, and the interior of which defines a launch chamber intended to receive a drone and in which there is a seat against which the drone is positioned before it is launched;
- a pressurization chamber located at the rear end of the launch tube and capable of being pressurized by a pressure source, the pressurization chamber having a first, front end in which is provided a passage opening leading into the launch chamber and, in use, behind the drone placed against the seat; and
- means for temporarily closing the passage opening, capable of switching instantaneously from a closed configuration, in which the passage opening is closed in a sealed manner, to an open configuration in which the passage opening is fully open, the temporary closing means being arranged to switch from the closed configuration to the open configuration instantaneously under the action of the gas pressure inside the pressurization chamber, after the latter has reached a predetermined pressure, referred to as the trigger pressure, and the cross section of the passage opening being sufficiently large that, instantaneously with the switching of the temporary closing means from the closed configuration to the open configuration, the gas pressure prevailing in the pressurization chamber and the space behind the drone, then in communication with each other, is the desired launching pressure for the drone, characterized in that the device comprises said pressure source, which is formed by an internal gas source arranged inside the pressurization chamber, said pressure source comprising, placed in the pressurization chamber, a diffuser, delimiting a reservoir with a first reactant, and a second reactant, the first and second reactants, when brought into contact with each other, reacting to generate a gas for pressurizing the pressurization chamber, a solenoid valve being arranged so as to allow selectively a fluid communication between the reservoir and the pressurization chamber.

The expression "fully open" means that the temporary closing means are clear of the passage opening.

Advantageously, the cross section of the passage opening is between 30% and 50% of the cross section of the launch chamber.

It is possible to provide that the temporary closing means are arranged to switch from the closed configuration to the open configuration by actuating a mechanically actuatable release means. For example, the temporary closing means may thus comprise a flap mounted so as to pivot freely at the outlet of the passage opening, or two flaps mounted so as to pivot freely about axes arranged on either side of the passage opening, and held in a closed position by a mechanical latch movable between a position in which the flap is locked in the closed position, and a release position in which it is disengaged from the flap, which is then caused instantaneously to pivot and open the passage opening by the gas pressure. The movement of the latch can be controlled by any suitable means, such as an electromagnet. In this way, the instruction to launch the drone is implemented by controlling the latch.

In a preferred embodiment, the temporary closing means are arranged to switch from the closed configuration to the open configuration automatically upon the gas pressure inside the pressurization chamber reaching the trigger pressure.

The temporary closing means may then advantageously comprise a rupture disc assembly that is disposed at the passage opening and comprises a calibrated diaphragm extending across the passage opening so as to close it, the diaphragm being dimensioned to break at the trigger pressure.

The calibrated diaphragm may, for example, be made of stainless steel, plastic or graphite. It can, of course, be made of any other suitable material.

The calibrated diaphragm can be designed to break all around its periphery, where it is made integral with the pressurization chamber, or to break from its centre, or in any other rupture mode that allows the passage opening to be fully open.

The rupture disc assembly can be removably fixed to the pressurization chamber. Preferably, the rupture disc assembly comprises a support ring and a fixing ring of the same dimensions and fixed to each other by fixing members passing through holes provided for this purpose in the rings, with the periphery of the calibrated diaphragm sandwiched between the rings, the rupture disc assembly being removably fixed to the front end of the pressurization chamber also by said fixing members.

Such a rupture disc assembly has the advantage of being both low cost and quick to open. When maintaining and reconditioning a new drone, it is simply a matter of replacing the broken diaphragm with a new one, which is more economical than replacing, for example, a pyrotechnic initiator and a gas-generating charge.

The rear end of the launch tube can be formed by a base removably fixed to an inner shoulder of the launch tube, from which base a tubular part extends, the longitudinal axis of which is coaxial with the longitudinal axis of the launch tube and which defines, together with the base, the pressurization chamber, a gasket being interposed between the tubular part and the inner annular edge of the inner shoulder. The device is therefore simple to make and assemble.

The front end of the launch tube can be closed with a tight plug.

Preferably, the first reactant is hydrogen peroxide ($H_2O_2$) under pressure and the second reactant is a potassium permanganate ($KMnO_4$)-based solid catalyst.

The device according to the present invention may further comprise a launch sabot capable of being received in the launch chamber and brought into contact against the seat, the launch sabot being configured to contain and surround the drone before launch and during its movement along the launch tube during ejection. The sabot protects and guides the drone in the launch tube during the launch phase, and also guides, pressurizes and distributes the energy developed by the gas pressure.

It should therefore be pointed out here that, according to the present invention, the drone can be in direct contact with the seat of the launch tube, or in indirect contact with it, via the sabot.

Advantageously, the launch sabot is formed of several separable segments, preferably four segments.

BRIEF DESCRIPTION OF THE SEVERAL VIEWS OF THE DRAWINGS

To better illustrate the subject-matter of the present invention, a particular embodiment will be described below, with reference to the attached drawings. On these drawings.

DETAILED DESCRIPTION OF THE INVENTION

Figure 1:
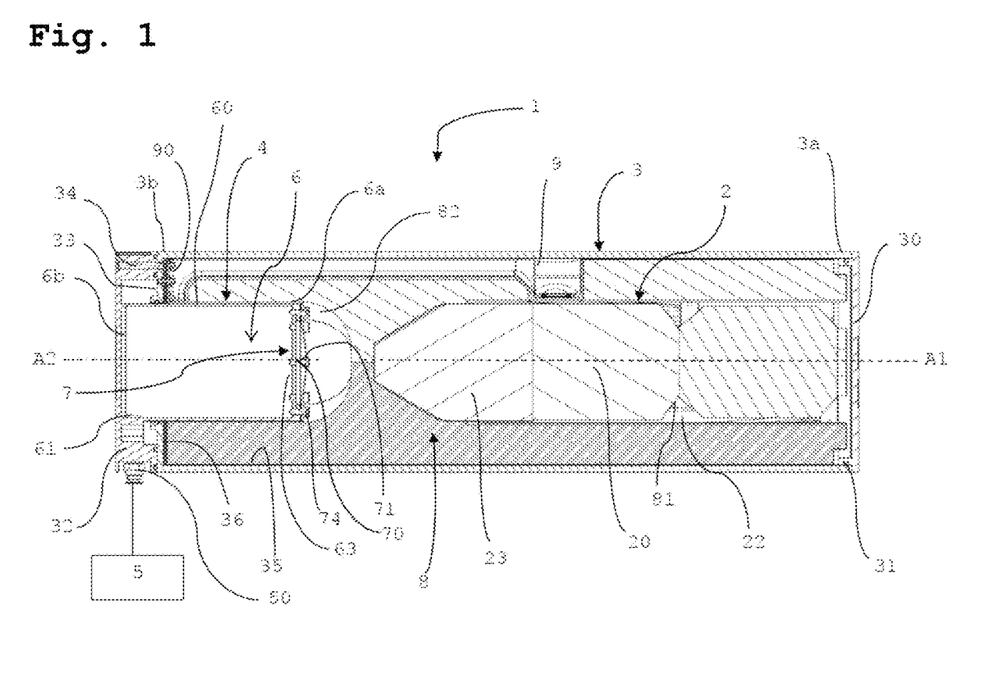
FIG. 1 is a side view, in longitudinal cross section, of the pneumatic launch device according to a particular embodiment not forming part of the claimed invention, with a pressure source according to a first embodiment.
Figure 5:
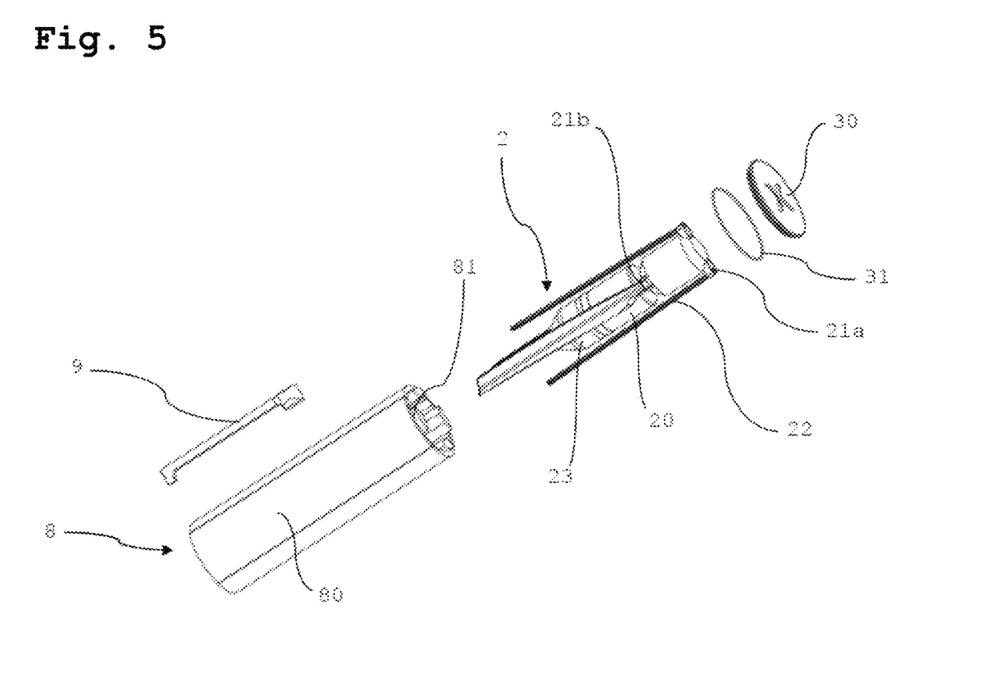
FIG. 5 is an exploded perspective view of the sabot and the drone in their configuration before launch.
Figure 6:
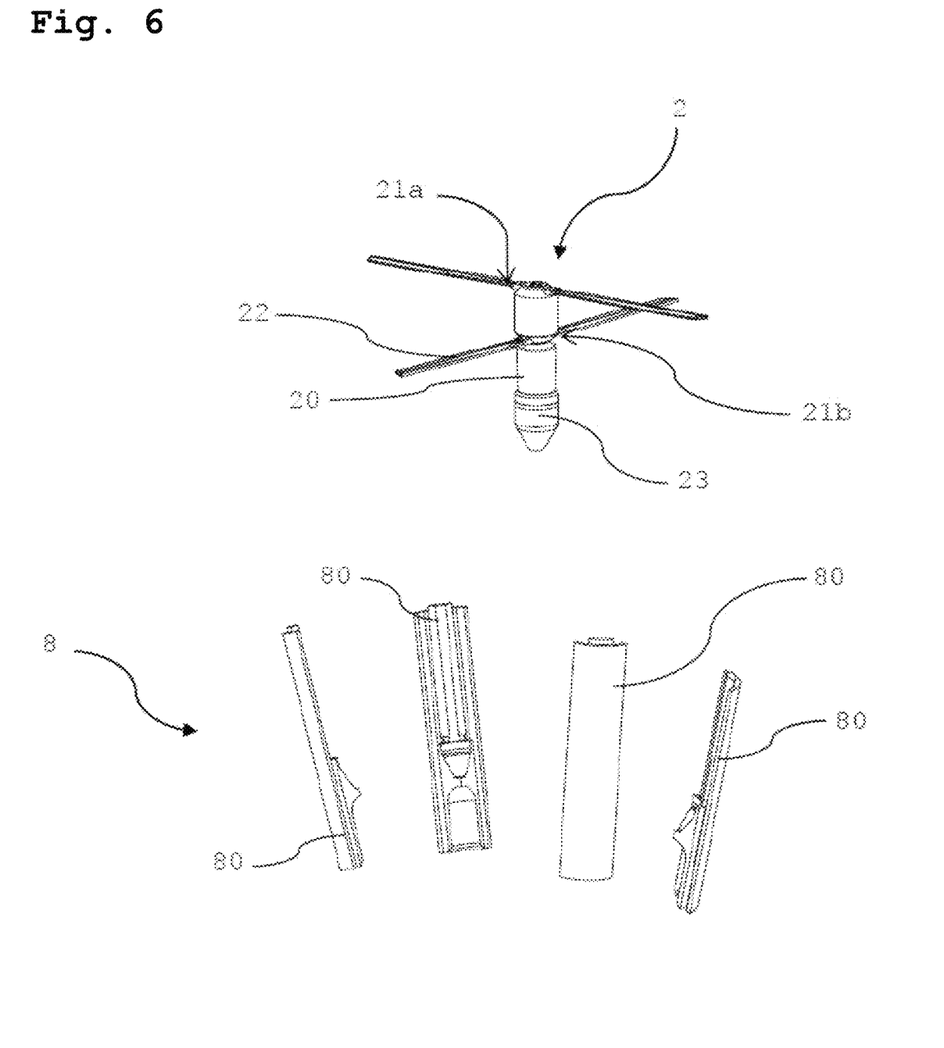
FIG. 6 is a perspective view of the sabot and the drone in their configuration after launch.

Referring first of all to FIGS. 1, 5 and 6, it can be seen that the pneumatic launch device 1 according to the present invention is intended for launching an object of the drone 2 type.

Such a drone 2 typically comprises a base body 20 containing a power plant, a battery pack and navigation electronics. The drone 2 shown in FIGS. 5 and 6 comprises two counter-rotating rotors 21a, 21b, i.e. two superimposed propellers. It should be noted that the drone 2 could comprise any number of rotors. The blades 22 of each rotor 21a, 21b are foldable and can therefore be moved from a folded position (FIG. 5) to a deployed position (FIG. 6). The drone 2 is equipped with a payload 23 removably mounted on the base body 20. This payload 23 may be a lethal or non-lethal load. For example, the drone 2 could be equipped with a lethal load of explosive type, a non-lethal load enabling paint or smoke to be released, or an optronic load enabling observation and detection.

Referring now to FIGS. 1 to 4, it can be seen that the device 1 comprises a launch tube 3 with a longitudinal axis A1, intended to receive the object to be launched, i.e. the drone 2, before it is launched, and ejection means 4 for ejecting the drone 2.

The launch tube 3 has a generally cylindrical shape about its longitudinal axis A1, and it has a front end 3a forming the mouth for the exit of the drone 2 and a rear end 3b in the region of which the ejection means 4 are arranged.

It is emphasized here that the terms "front" and "rear" refer to the predetermined direction of movement of the drone 2 relative to the launch tube 3 during launch.

The front end 3a is closed, prior to launch, by a circular tight plug 30, the diameter of which corresponds to the external diameter of the launch tube 3. An O-ring 31 is interposed between the plug 30 and the internal wall of the launch tube 3, at the front end 3a.

The rear end 3b is formed by a base 32 in the form of a block of circular cross section, the diameter of which corresponds to the external diameter of the launch tube 3. The base 32 is fixed to an internal shoulder 33 of the launch tube 3, which is annular in shape, by fixing members 34, such as screws, passing through orifices provided in the base 32 and orifices provided in the inner shoulder 33 and located opposite each other.

The launch tube 3 defines therein a cylindrical launch chamber 35 having, in the region of the rear end 3b, a seat 36, here formed by the inner shoulder 33, against which the drone 2 will be placed before ejection from the launch tube 3 by the ejection means 4.

The ejection means 4 comprise a pressure source 5 or 5', a pressurization chamber 6 and temporary closing means 7.

The pressure source 5 or 5' is intended to enable the pressurization chamber 6 to be pressurized by compressed gas, which may be air, an inert gas, steam, etc., or any combination thereof.

It is therefore emphasized that, although the term "pneumatic" is used to designate the launch device according to the present invention, it is not limited to the use of air as the gas for launching the drone 2.

The pressure source can be any gas pressure source.

In the embodiment shown in FIG. 1 and not forming part of the claimed invention, for reasons of space, the pressure source 5 is an external pressure source, i.e. it is arranged outside the launch tube 3 and can be brought into communication with the pressurization chamber 6 by means of a pneumatic connection 50. This pneumatic connection 50 has an inlet hole leading into the base 32.

The pressurization chamber 6 is laterally delimited by a tubular part 60, with a longitudinal axis A2, extending perpendicularly from the transverse wall of the base 32, in other words parallel to said longitudinal axis A1, towards the front end 3a of the launch tube 3. The pressurization chamber 6 thus has a rear end 6b closed by said transverse wall and an open front end 6a, and is located inside the rear region of the launch tube 3. The tubular part 60 is here integrally formed with the base 32, but alternatively the pressurization chamber 6 can be fixed to it by any suitable means.

A gas inlet hole 61 is provided in a region of the side wall of the pressurization chamber 6 that is located in the base 32, to allow gas entering through an inlet hole of the base 32 to enter the pressurization chamber 6.

Figure 2:
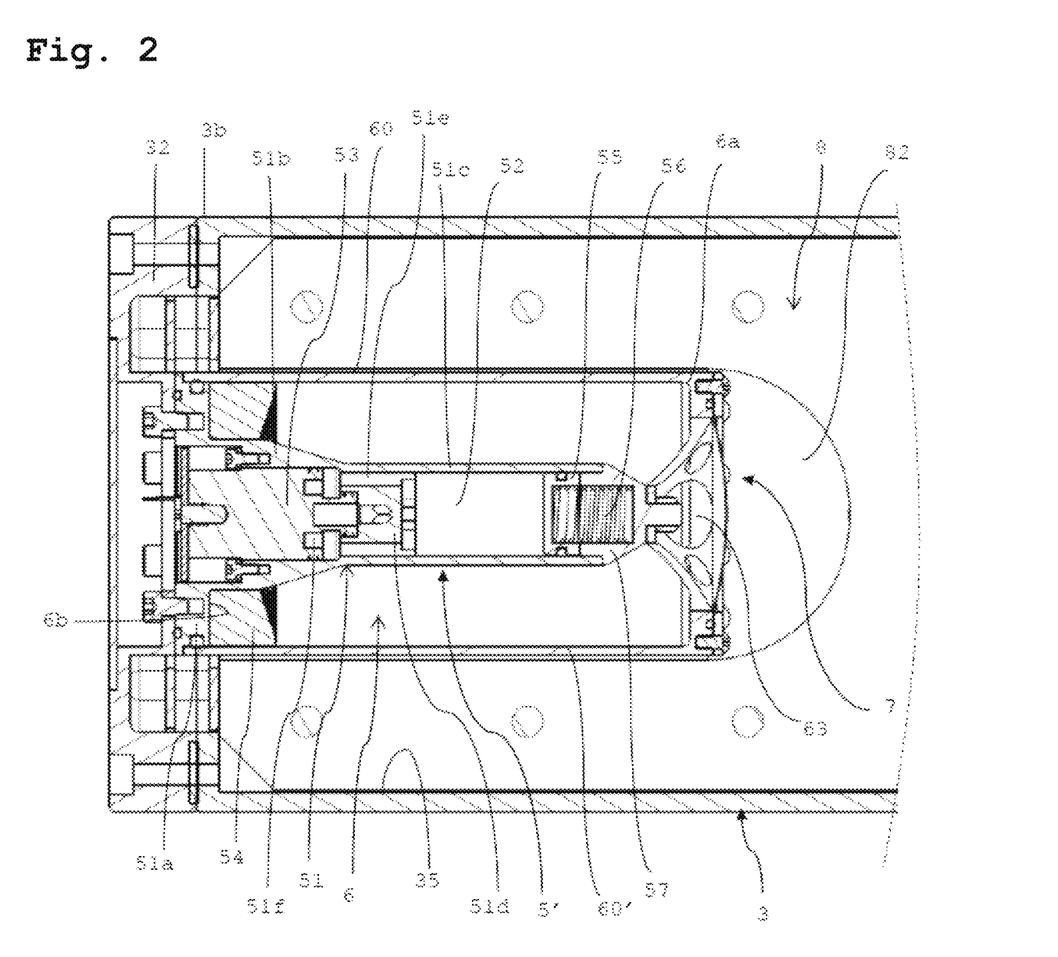
FIG. 2 is a side view, along a first partial longitudinal cross section plane, of the pneumatic launch device of FIG. 1, with a pressure source according to the present invention.
Figure 3:
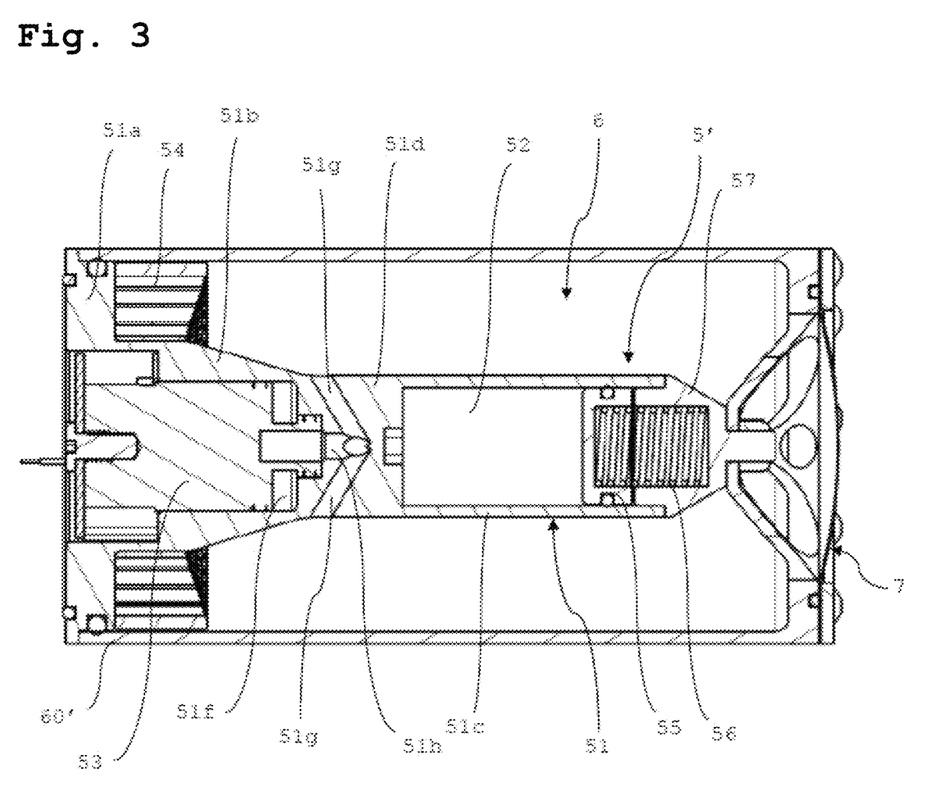
FIG. 3 is a longitudinal cross section view of the pressure source according to the present invention, along a cross section plane perpendicular to said first cross section plane.

In the embodiment shown in FIGS. 2 and 3, the pressure source is an internal pressure source 5', i.e. located inside the launch tube 3, and more particularly inside the pressurization chamber 6, which is formed here by a pressurization bell 60'.

The pressure source 5' is a chemical initiator, here based on the reaction between hydrogen peroxide ($H_2O_2$) and potassium permanganate ($KMnO_4$).

The chemical initiator 5' comprises a diffuser 51 defining a reservoir 52 of $H_2O_2$, a solenoid valve 53, a $KMnO_4$-based solid catalyst 54, a piston 55, a spring 56 and a reservoir cap 57.

The pressurization bell 60' is in the form of a tubular body intended to receive all the components of the chemical initiator 5' and fixed to the base 32 so as to delimit a chamber similar to that formed by the tubular part 60, namely located at the rear end 3b of the launch tube 3. The longitudinal axis of the bell 60' is thus also coaxial with the longitudinal axis A1 of the launch tube 3.

The diffuser 51 is formed by a generally cylindrical part, one end of which has an annular flange 51a on which the bell 60' is mounted, with the interposition of a gasket between them, and which is made integral with the base 32, in particular by screws, again with the interposition of a basket between them. The generally cylindrical part comprises, starting from the flange 51a, a rear part 51b in which is provided a cavity leading into the central opening of the flange 51a and receiving the solenoid valve 53, a tubular front part 51c, the front end of which is closed by the reservoir cap 57, and an intermediate part 51d separating the rear and front parts 51b, 51c.

The piston 55 is mounted inside the front part 51c, between the cap 57 and the intermediate part 51d. The spring 56 is a helical spring mounted between the piston 55 and the cap 57, the ends of the spring 56 bearing against the piston 55 and the cap 57, respectively. The cap 57 and the piston 55 each comprise a cavity, said cavities being capable of receiving the spring 56 when the cap 57 and the piston 55 are in contact with each other. The region laterally delimited by the internal side wall of the front part 51c, at the rear by the intermediate part 51d and at the front by the piston 55, constitutes the reservoir 52 of $H_2O_2$ that can be pressurized by the action of the piston 55 and the spring 56. The front end of the cap 57 is made integral with the front end of the bell 60', the latter itself being made integral, in particular by screwing, with the temporary closing means 7.

The $KMnO_4$-based solid catalyst 54 is received in the space formed between the first part 51b of the diffuser 51 and the internal side wall of the bell 60'. This solid catalyst 54 is therefore in the form of an annular body with a rear wall in contact with the flange 51a.

As it can be seen more clearly in FIG. 2, first channels 51e are provided in the intermediate part 51d so as to place in fluid communication with one another the reservoir 52 and a free space 51f in the cavity in which the solenoid valve 53 is housed. The first channels 51e are parallel to the longitudinal axis of the diffuser 51. Referring now to FIG. 3, it can be seen that second angled channels 51g are also provided in the intermediate part 51d so as to place the pressurization chamber 6 in fluid communication with an outlet passage 51h provided in the centre of the intermediate part 51d and which can be placed in fluid communication with said free space 51f by actuating the solenoid valve 53. The solenoid valve 53 can therefore be controlled so as to cause the contents of the reservoir 52 to enter the pressurization chamber 6 where the solid catalyst 54 is located.

The exothermic chemical reaction between the $KMnO_4$-based solid catalyst 54 and $H_2O_2$ contained in the reservoir 52 generates a very large quantity of oxygen and water vapour, allowing the pressurization chamber 6 to be pressurized up to the trigger pressure.

The longitudinal axis A2 of the pressurization chamber 6 is coaxial with the longitudinal axis A1 of the launch chamber 35. The external diameter of the pressurization chamber 6 is smaller than the internal diameter of the launch tube 3, so that a free space is formed between the external wall of the pressurization chamber 6 and the internal wall of the launch tube 3, allowing part of the object to be ejected to be received therein if necessary.

The pressurization chamber 6, whether defined by the tubular part 60 or the pressurization bell 60', has, at its open front end 6a, an annular internal rim 62 which delimits a circular passage opening 63 leading into the launch chamber 35.

The temporary closing means 7 are arranged at the passage opening 63 and serve to close it selectively. More specifically, the temporary closing means 7 are able to close the passage opening 63 before launch and leave it free at the time of launch.

In other words, the temporary closing means 7 are able to switch instantaneously from a closed configuration to an open configuration. In the closed configuration, the front end 6a is closed, so that the pressurization chamber 6 is closed in a sealed manner and no exchange of gas is possible between the pressurization chamber 6 and the launch chamber 35, which are not in communication. In the open configuration, the passage opening 63 is not closed, the front end 6a is open, the pressurization chamber 6 and the launch chamber 35 are in communication, and the gas contained in the pressurization chamber 6 enters the launch chamber 35 to eject the drone 2.

In the preferred embodiments of the present invention (FIGS. 1 to 4), the temporary closing means 7 comprise a rupture disc assembly 70 comprising a calibrated diaphragm 71.

The rupture disc 70 has a support ring 72 fixed to the front end 6a of the pressurization chamber 6 and carrying the calibrated diaphragm 71.

The support ring 72 has a first side, a second side, an outer peripheral edge and an annular inner peripheral edge, the latter delimiting a central opening 72a the diameter of which, in other words the internal diameter of the support ring 72, is equal to the diameter of the passage opening 63. The external diameter of the support ring 72 is equal to the external diameter of the tubular part 60, and, if applicable, to the external diameter of the bell 60'. The first side of the support ring 72 is applied against the internal rim 62 and the second side of the support ring 72 is therefore oriented towards the front end 3a of the launch tube 3. In other words, the support ring 72 is interposed between the front end 6a of the pressurization chamber 6 and the launch chamber 35.

The calibrated diaphragm 71 extends across the central opening 72a of the support ring 72. Thus, in the closed configuration, the calibrated diaphragm 71 closes the entire passage opening 63.

Figure 4:
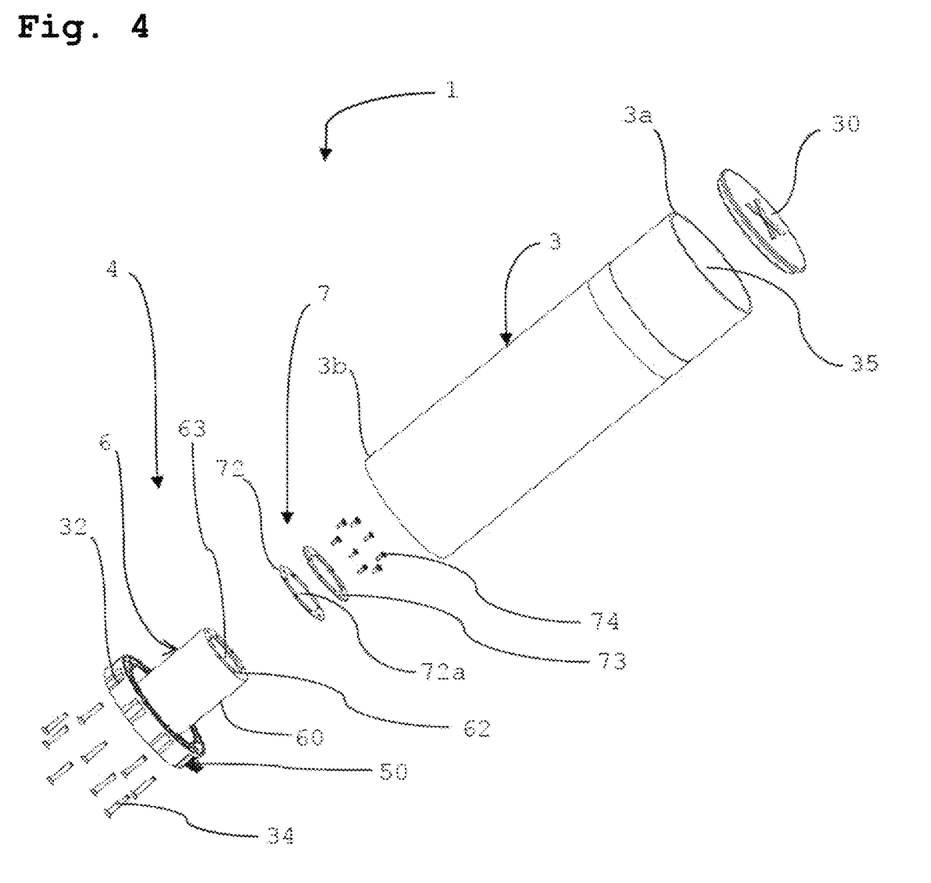
FIG. 4 is an exploded perspective view of the device of FIG. 1, with the sabot and drone omitted.

As regards the method of rupture of the diaphragm 71, various variants may be suitable, provided that the rupture of the diaphragm 71 clears the entire cross section of the passage opening 63. For example, the diaphragm 71 could rupture at its periphery, i.e. where it joins the support ring 72, or at its centre.

The rupture disc assembly 70 is fixed to the pressurization chamber 6 by a fixing ring 73. The fixing ring 73 is a part similar to the support ring 72 and is in the form of a flat annular section of the same dimensions as the support ring 72. A first side of the fixing ring 73 is applied against the second side of the support ring 72. Holes, capable of receiving fixing members 74, are provided in the fixing ring 73, so as to face corresponding holes provided in the support ring 72 and in the internal rim 62. The rupture disc assembly 70 is thus fixed to the open end 6a of the pressurization chamber 6 by fixing members 74 passing through the fixing ring 73, the diaphragm 71, the support ring 72 and the internal rim 62, and the heads of which are located on the launch chamber 35 side. When the rupture disc assembly 70 is assembled, it is therefore interposed between the internal rim 62 and the fixing ring 73. This type of assembly is easy and enables the rupture disc assembly 70 and the diaphragm 71 to be easily and quickly dismantled after rupture, in order to replace it with another rupture disc carrying an unbroken diaphragm, or to replace the diaphragm alone.

Referring again to FIGS. 1, 2, 5 and 6, it can be seen that the device 1 also includes a launch sabot 8 intended to receive the drone 2.

The launch sabot 8 is sized and configured to be received in the launch chamber 35 to enable the drone 2 to be guided into the launch tube 3 during the launch phase, and to surround a drone 2 to enable the drone 2 to be protected during launch. It should be noted that a different sabot 8 is defined according to the profile of the drone 2 and its payload 23.

In the particular embodiment shown, the sabot 8 is formed of several separable segments 80, in particular four segments 80. These segments 80 delimit between them a drone receiving space 81 having an opening intended to be located facing the front end 3a of the launch tube 3. These segments 80 also delimit between them a receiving space 82 for the pressurization chamber 6, having an opening intended to allow passage of the pressurization chamber 6 when the sabot 8 is introduced into the launch chamber 35.

The segments 80 can be identical.

Alternatively, the sabot 8 could be formed of four separable segments, three of which are identical and one of which contains a charging and communication device 9 between the drone 2 and the launch tube 3. As the sabot 8 is intended to be ejected from the launch tube 3 and to become detached from the drone 2 after launch, the charging and communication device 9 is a wireless device. Preferably, this device 9 is of inductive type and comprises a transmitting coil capable of cooperating with a receiving coil housed in the drone 2. This device 9 also comprises spring contacts 90 capable of cooperating with a contact plate provided in the launch tube 3 for connection between this device 9 and the launch tube 3.

The device 1 enables drones to be launched by controlling the launching pressure by which the drone 2 is ejected, and therefore ensures reliable and reproductive ejection for a quick deployment of the drone 2.

This is possible because:
  on the one hand, the diaphragm 71 is calibrated to open by breaking when the pressure applied to it by the gas present in the pressurization chamber 6 reaches a predetermined value, which will be the so-called trigger pressure, the rupture disc assembly 70 then switching instantaneously to its open configuration, and
  on the other hand, the cross section of the passage opening 63 is large enough so that, immediately after the rupture of the diaphragm 71, the pressure prevailing in the volume composed of the pressurization chamber 6 and the free space of the launch chamber 35 located between the pressurization chamber 6 and the drone 2 (i.e. here the receiving space 82 formed by the sabot 8), is the desired launching pressure for the drone 2.

Indeed, at the very moment the calibrated diaphragm 71 breaks, the compressed gas instantly occupies all the free volume available to it.

Consequently, depending on characteristics of the launch tube, such as its internal diameter and length, and of the drone, such as its weight, the speed and the height at which it must be ejected before it can be deployed safely, the launching pressure can be defined in advance, i.e. the gas pressure to be applied to it when it is in position against the seat 36, taking into account the volume of the pressurization chamber 6 and the volume of said free space, and thus the trigger pressure, i.e. the gas pressure in the pressurization chamber 6 which will allow to obtain the launching pressure after rupture of the calibrated diaphragm 71.

Thus, when a drone 2 is to be launched, the launch sabot 8, in the receiving space 81 of which the drone 2 is received, is first inserted through the open front end 3a of the launch tube 3, until it is placed in contact with the seat 36, then the front end 3a of the launch tube 3 is closed by the tight plug 30.

When it is desired to launch the drone 2, the pressure source 5 or 5' is brought into communication with the pressurization chamber 6 or actuated to pressurize the pressurization chamber 6 to the desired trigger pressure. As soon as the trigger pressure is reached, the diaphragm 71 breaks, opening the passage opening 63. The compressed gas in the pressurization chamber 6 is released and instantaneously occupies the receiving space 82 of the sabot 8 and applies a thrust force against its face, ejecting the sabot 8 and the drone 2 from the launch tube 3, ejecting at the same time the tight plug 30. Once ejected from the launch tube 3, the sabot 8 separates into separate segments 80 as a result of air friction and the thrust exerted by the blades 22 of the drone 2 as they switch to the deployed position. Once at its maximum height, the drone 2 starts up and stabilizes, and its mission can begin.

If it is desired to launch a plurality of drones 2, a plurality of launch devices 1 according to the present invention can be mounted on the same vehicle (not shown). In this case, and if the pressure source is an external pressure source, a single pneumatic circuit is required to pressurize the pressurization chambers 6. In this variant, each launch tube 3 can be colour-coded according to the payload 23 with which the drone 2 is equipped. This enables quick visual identification of the object to be ejected.

It is understood that the particular embodiments just described are indicative and non-limiting, and that modifications may be made without departing from the scope of the present invention.

The invention claimed is:

1. A device for pneumatic launching of a drone, the device comprising:
   a longitudinal launch tube having a first, rear end, which is closed, and a second, front end, which is open, and an interior of the launch tube defines a launch chamber intended to receive a drone and in which there is a seat against which the drone is positioned before the drone is launched;
   a pressurization chamber located at the rear end of the launch tube and capable of being pressurized by a pressure source, the pressurization chamber having a first, front end in which is provided a passage opening leading into the launch chamber and, in use, behind the drone placed against the seat; and
   temporary closing means for temporarily closing the passage opening, the temporary closing means being capable of switching instantaneously from a closed configuration, in which the passage opening is closed in a sealed manner, to an open configuration in which the passage opening is fully open; and
   the temporary closing means being arranged to switch from the closed configuration to the open configuration instantaneously under action of a gas pressure inside the pressurization chamber, after the pressurization chamber has reached a predetermined pressure, referred to as a trigger pressure, and a cross section of the passage opening being sufficiently large that, instantaneously with a switching of the temporary closing means from the closed configuration to the open configuration, the gas pressure prevailing in the pressurization chamber and a space located behind the drone, then in communication with each other, is a desired launching pressure for the drone; and
   wherein the device comprises said pressure source, which is formed by an internal gas source arranged inside the pressurization chamber, said pressure source comprising, placed in the pressurization chamber, a diffuser and a second reactant, the diffuser delimiting a reservoir including a first reactant, the first and second reactants, when brought into contact with each other, reacting to generate a gas for pressurizing the pressurization chamber, a solenoid valve being arranged so as to allow selectively a fluid communication between the reservoir and the pressurization chamber.

2. The device according to claim 1, wherein the cross section of the passage opening is between 30% and 50% of a cross section of the launch chamber.

3. The device according to claim 1, wherein the temporary closing means are arranged to switch from the closed configuration to the open configuration automatically upon the gas pressure inside the pressurization chamber reaching the trigger pressure.

4. The device according to claim 3, wherein the temporary closing means comprises a rupture disc assembly that is disposed at the passage opening and comprises a calibrated diaphragm extending across the passage opening so as to close the passage opening, the calibrated diaphragm being dimensioned to break at the trigger pressure.

5. The device according to claim 4, wherein the rupture disc assembly is removably fixed to the pressurization chamber.

6. The device according to claim 5, wherein the rupture disc assembly comprises a support ring and a fixing ring of same dimensions and fixed to each other by fixing members passing through holes provided for this purpose in the support ring and the fixing ring, with a periphery of the calibrated diaphragm sandwiched between the support ring and the fixing ring, the rupture disc assembly being removably fixed to the front end of the pressurization chamber also by said fixing members.

7. The device according to claim 1, wherein the rear end of the launch tube is formed by a base removably fixed to an inner shoulder of the launch tube, from which base a tubular part extends, a longitudinal axis of the tubular part being coaxial with a longitudinal axis of the launch tube and the tubular part defining, together with the base, the pressurization chamber, a gasket being interposed between the tubular part and an inner annular edge of the inner shoulder.

8. The device according to claim 1, wherein the first reactant is hydrogen peroxide ($H_2O_2$) under pressure and the second reactant is a potassium permanganate ($KMnO_4$)-based solid catalyst.

9. The device according to claim 1, wherein the device further comprises a launch sabot capable of being received in the launch chamber and brought into contact against the seat, the launch sabot being configured to contain and surround the drone before launch and during the movement of the drone along the launch tube during ejection.

10. The device according to claim 9, wherein the launch sabot is formed of several separable segments.

\* \* \* \* \*